Sept. 4, 1962 W. J. RUSCOE ETAL 3,052,589
METHOD OF MAKING A PLASTIC COVERED SHEET
AND PRODUCTS MADE THEREFROM
Filed Sept. 16, 1958
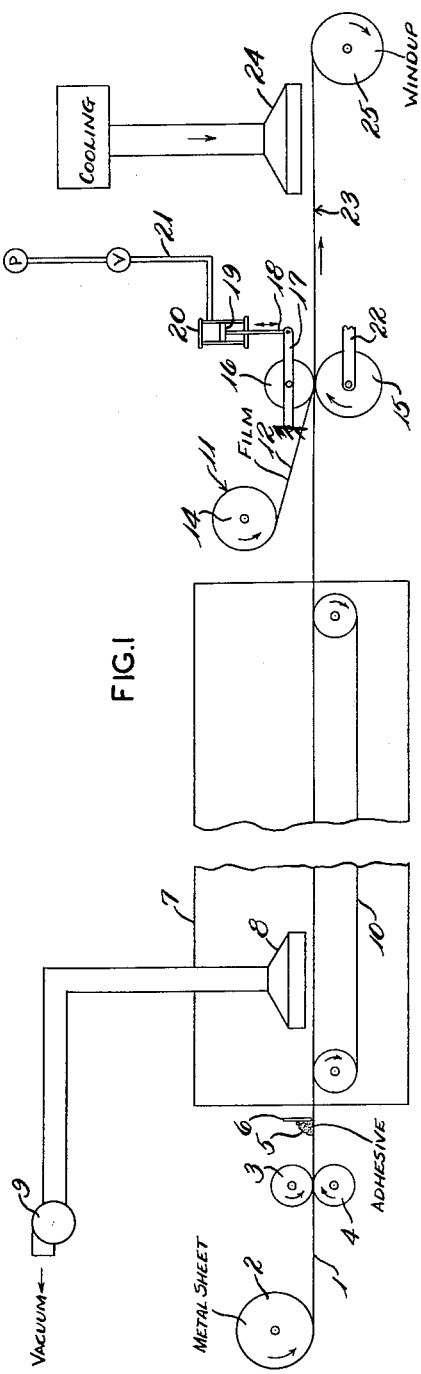
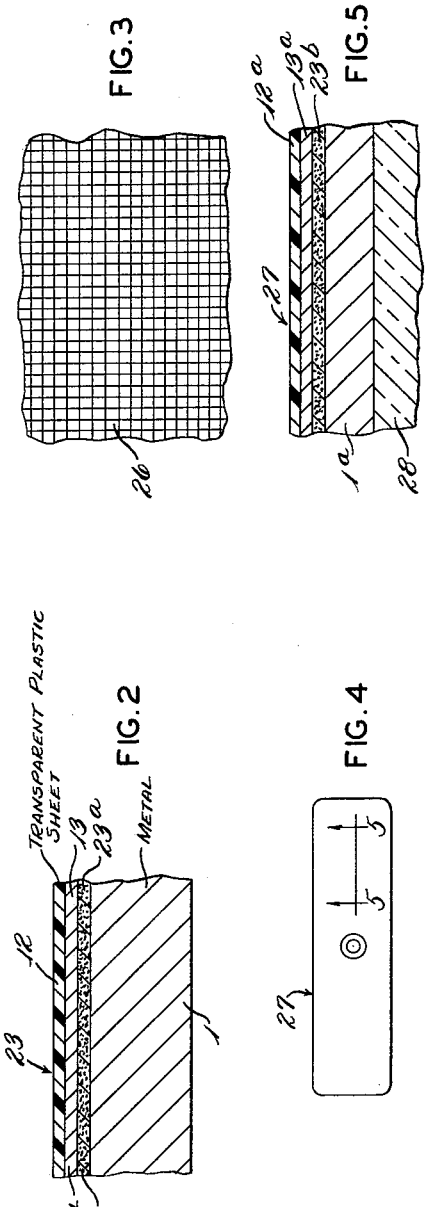
INVENTORS
WILLIAM J. RUSCOE
ROBERT M. MC PHERSON
JOHN W. CLAUSE
BY
ATTYS.

United States Patent Office 3,052,589
Patented Sept. 4, 1962

3,052,589
METHOD OF MAKING A PLASTIC COVERED SHEET AND PRODUCTS MADE THEREFROM
William J. Ruscoe and Robert M. McPherson, Akron, and John W. Clause, Kent, Ohio, assignors to W. J. Ruscoe Company, Akron, Ohio, a corporation of Ohio
Filed Sept. 16, 1958, Ser. No. 761,335
8 Claims. (Cl. 156—277)

This invention relates to a new and improved method of securing a thin transparent plastic film having a very thin metal layer on the back surface thereof, or a pigmented adhesive to incorporate color and/or design and to bond the film to a carrier metal sheet, composition board, plywood or similar rigid material and to the articles made from such novel and improved plastic covered materials.

There has been work done in the past in bonding plastic sheets to other materials, such as metal carrier sheets. Such plastic sheets, as far as I am aware, have been quite thick, such as one-sixteenth to one-eighth inch, and usually have been used to produce composite structures with heavy colored plastic material on the sheets for design and other purposes.

One important use of aluminum in the past has been to make highly reflective metal sheets therefrom, which sheets are used in the production of various types of reflectors for use with lamps. Such reflective aluminum sheets have been quite costly to produce, and have only been available from one or two of the leading companies producing aluminum at this time.

It is well recognized that large quantities of metal articles are given chrome platings or other special metal finishes to increase the surface resistance of such metal sheets to corrosion, or to improve the appearance of the article. However, even these costly finish layers applied to metal sheets have been quite subject to corrosion after relatively short periods of use so that any type of a surface finish that can be provided for metals to cut down corrosion thereof and to provide an attractive appearance therefor is very desirable and would have wide commercial use.

One prior Patent No. 2,728,703 shows a process that bonds vinyl films of about .008 to 0.10 in thickness to a metal sheet and heats the film to a soft, limp state in the lamination operation which involves use of special adhesives. However, the use of vinyl films is not satisfactory in many instances, and such patent works with a fairly thick film requiring large amounts of plastic material in laminating or covering large footage sheets or members.

It is readily recognized that nearly all articles made require that some type of surface finish be applied thereto. Hence, finishes have been provided for composition board, plywood, and other similar materials but these finishes may have been costly, or not have provided the desired service life or they may have been otherwise objectionable.

It therefore is the general object of the present invention to provide a novel and improved method of securing a plastic film to metal sheets to improve the corrosion resistance thereof and to provide attractive finishes on base sheets, or articles made therefrom.

Another object of the invention is to provide a surface finish process applicable to rigid base sheets such as composition board, Masonite, plywood, etc. to provide an attractive, inert, long-lived surface finish thereon and on articles made therefrom.

Other objects of the present invention are to use a flexible plastic film and/or metal film unit with a dried partially set thermosetting resin-rubber adhesive thereon and which can be permanently united to a base sheet having a similar partially set layer of a thermosetting resin-rubber adhesive thereon to obtain a permanent bond between such members and form a composite unit; to provide a metal article with a substantially inert plastic film having a metal film layer on the inner surface thereof and used for bonding the plastic film to a metal carrier sheet; and to provide a transparent polyester film having oriented molecular structure with a reflective aluminum film on the inner surface thereof, which unit is bonded to a suitable base sheet by a thermosetting resin-rubber type of adhesive to leave the reflective aluminum film surface on the inner face of the polyester film visible through such film on the finished product.

A further object of the invention is to provide a transparent polyester film having oriented molecular structure with a dried, partially set film of thermo-plastic and thermosetting resin-rubber adhesive in which said adhesive may be pigmented to obtain design and/or color through the clear polyester film as well as performing the function of a bonding medium between the film and the rigid base.

Yet another object of the invention is to heat a dried adhesive coated plastic film rapidly to at least about 290° F. and to bond the adhesive coating on such film with a hot, dried, partially set adhesive on a base layer to provide a unitary laminated product.

A further object is to bond transparent plastic films made from materials retaining room temperature properties at high temperatures, such as at least about 290° F., to base sheet members.

Another object of the invention is to provide a metal sheet with a transparent plastic film coating thereon, which plastic film has a reflective metal layer secured to the inner surface thereof so that a highly reflective surface is provided on such sheet and on any article made therefrom.

A further object of the invention is to bond a thin transparent plastic film to a metal sheet with sufficient adhesion that articles can be stamped or drawn from the metal sheet without injuring the plastic film to provide a continuous protective coating on the finished article.

Another object of the invention is to provide a novel method of bonding a composite flexible metal film-transparent plastic film unit to a metal sheet by the metal film face of such unit to obtain substantially permanent adhesion therebetween.

The foregoing and other objects and advantages of the invention will be made more apparent as the specification proceeds.

Reference now should be had to the accompanying drawings, wherein:

FIG. 1 diagrammatically shows apparatus for performing the method of the invention to provide an improved plastic film coated metal sheet;

FIG. 2 is an enlarged vertical section through a typical sheet produced in accordance with the invention;

FIG. 3 is a plan view of a sheet of the invention having a design incorporated in the face thereof;

FIG. 4 is a plan view of a metal article made from a metal sheet embodying the principles of the invention and in this instance, comprising a carrier case for a rear view mirror of an automobile; and FIG. 5 is an enlarged section taken on line 5—5 of FIG. 4.

When referring to corresponding parts shown in the drawings and referred to in the specification, corresponding numerals are used to facilitate comparison therebetween.

The present invention is useful with metal sheets made from any conventional material such as aluminum, steel, or other known materials, as desired.

The invention particularly relates to the bonding of a thin transparent plastic sheet, such as one made by the E. I. du Pont de Nemours & Company and called "Mylar," which sheet is known as an oriented polyester film and is transparent in thin gauges such as about .0005 to .001 or about .002 inch thick. Such transparent polyester film is provided with a coating of a very thin layer of a metallic material, usually aluminum, which is deposited onto the polyester film on one surface thereof by vapor deposition so that a highly reflective side is provided on the composite film and is visible through the polyester film. This aluminized film is still at least opaque and is flexible and easily handled.

The polyester film referred to hereinbefore is made from the materials and processes disclosed in U.S. Patent No. 2,465,319 and with such film being obtained by conventional processing operations in general like those described in said patent for the production of fibers and filaments. The aluminum metal film deposited on the polyester film can be deposited thereon in any conventional metal film deposition process, examples of which are found in the vacuum deposition teachings of U.S. Patents Nos. 2,074,281 and 2,153,786.

Reference now should be had to the accompanying drawings wherein details of the present invention are shown. In these drawings, the process of the invention is being applied to a continuous metal base sheet 1 which sheet may be made from aluminum, steel or any other desired material. This sheet in this instance is of such gage as to be rolled upon a coil shown at 2 and to be pulled therefrom by means of a pair of rolls 3 and 4 between which the metal sheet is drawn for processing. After passing between the rolls 3 and 4, the metal sheet 1 is supplied with a layer of suitable liquid thermosetting resin-rubber type adhesive 5 that is uniformly spread over the sheet 1 by a suitable knife or blade 6. Thereafter, the adhesive coated sheet passes into a drying and setting oven 7 which oven is heated by use of any conventional means and which has an exhaust or suction hood 8 provided therein adjacent the input end of the oven. Such exhaust hood 8 connects to a pump, fan or equivalent member 9 for pulling gases from the oven 7.

Usually the adhesive 5 has some type of a volatile solvent in which the solid components of the adhesive are disposed so that the exhaust 8 pulls such solvent from the adhesive in the form of gases during the initial heating action thereon. The oven 7 usually has a suitable conveyor 10 journalled therein moving therealong for support of the metal sheet 1 as it is in and passing through the oven 7. Such solvents are driven off during the initial heating action on the adhesive when the temperature thereof has reached about 100° F. The oven is heated to any desired temperature for drying and substantially setting the adhesive material used. The actual temperature depends somewhat upon the materials being used, the thickness of the base metal sheet, the thickness of the adhesive layer, etc., so that the final temperature in the oven 7 near the exit end thereof may be as high as 400 to 500° F. and have effected equivalent heating of the adhesive and material 5 and metal sheet 1 while in and passing through the oven.

The actual adhesive used in practice of the invention is of the thermoplastic and thermosetting type and in general comprises a phenolic type resin modified with nitrile rubber and with the adhesive being dissolved in a solvent such as methyl-ethyl ketone. Such nitrile-phenolic resins are basically thermosetting materials, but because of their rubber content has some thermoplastic properties and do not become completely hard even when fully set. In general, the adhesives used are believed to best comprise about a 50–50 blend by weight of nitrile rubber and a phenol-aldehyde resin material dissolved in suitable solvents. One of such types of adhesives commercially available on the market is the material "Pliobond" sold by the Goodyear Tire & Rubber Company of Akron, Ohio.

The length of the oven 7 is such that the adhesive material is substantially dried and at least partially cured or set while passing therethrough. Thereafter, a composite film unit which is shown stored on a reel 14 is brought into register with the metal sheet 1 for bonding action therewith. This film unit 11 comprises a transparent plastic film 12, such as one made from polyester material "Mylar" having an oriented molecular structure. This film, I understand, is made in accordance with the teachings of the patent referred to hereinbefore. The film has a usual thickness of, for example, .0005, .001 or .002 inch, but it may be as thick as .010 inch, and it has a coating of a very thin, opaque film of aluminum or other desired metal on one surface thereof and intimately bonded thereto, as by depositing the metal under vacuum. Such aluminum film 13 has had a coating of the adhesive material 5 applied thereto by a prior passage of the transparent film 12 and aluminum film 13 through the first portion of the apparatus shown in FIG. 1, or apparatus similar thereto. During such processing, an adhesive coating is applied to and dried on the exposed surface of the aluminum film 13. Hence, the composite film unit 11 produced can be wound upon itself without the adhesive layer on the aluminum film 13 sticking objectionably to the adjacent convolutions of the plastic and metal film materials.

This composite film unit 11 is stored on the roll 14 and is fed therefrom between rolls 15 and 16. The roll 15 has a fixed positioned support shaft provided therefor whereas the roll 16 is carried by suitable levers 17 which connect to a piston rod 18 extending from and controlled by a piston 19. This piston 19 is received in a pressure cylinder 20 so that by the provision of suitable fluid pressure to the cylinder 20 by supply line 21, the levers 17 can be used to force the roll 16 against the roll 17, or to pull the roll 16 from contact therewith, as desired. Hence, suitable pressures can be applied to the materials passing between the rolls 15 and 16.

Normally it is necessary that some suitable heat source be supplied to the roll 16 and a steam supply conduit 22 is shown connected to the bore of the roll 16 to heat such roll and the surface area thereof. It is an important feature of the invention that the roll 16 is heated to at least about 290° F. and that the film 11 be introduced between the rolls 15 and 16 at least substantially but slightly in advance of the roll bight, as shown in FIG. 1. Because of the thinness of the film 11, it is heated almost instantly to high temperatures by contact with the roll 16 and the coated sheet 1. The rolls 15 and 16 should exert about 150 lb. per square inch on the film 11 and the film moves at about 20 to 30 feet per mintue through the roll bight. The coated sheet 1 usually enters the roll bight at about 400° F. with the adhesive thereon dried and partially cured or set, while the film 11 has the adhesive thereon only dried. However, both adhesive layers carried by the metal sheet 1 and the film unit 11 are heated and finally set and unified while under the heated pressure rolling action supplied by the rolls 15 and 16 to produce a composite laminated sheet 23. Next the composite sheet 23 usually is subjected to a positive cooling action as by blowing air thereover by means of a cooling hood 24 suitably connected to and supplied with a flow of cooling air. Thereafter the laminated end product can be stored upon a storage reel 25, or be otherwise processed, as desired.

The laminated sheet 23 produced by practice of the invention, as shown in enlarged detail in FIG. 2, shows that the metal sheet 1 is much thicker than the transparent plastic film 12 and that the aluminum film 13 is also very thin in relation to the base metal sheet 1. The adhesive layers initially applied to the separate sheets or units of the invention have become an integral adhesive layer 23a shown in FIG. 2. Obviously the relative sizes and thicknesses of these sheets can be varied as desired but normally the plastic film and the metal films used are extremely thin and form a flexible unit having a transparent surface film therein so that a reflective metal surface on the aluminum film 13 is visible through the film 12.

The relative speeds at which the surfaces of the rolls 3 and 4, and the rolls 15 and 16 move are such that the materials being processed are kept under sufficient tension at all times to aid in maintaining them flat, but not to stretch the sheets processed appreciably.

The metal film layer deposited on the film unit 11 can be made from colored metal if desired.

In some practice of the present invention, it is desirable to replace the metal base sheet 1 with sheets or sections of plywood, Masonite, composition board, or the like. In some instances, it is desirable to provide a design in the transparent film 12 and such design will normally be on the outer surface of the end product. Thus, for example, a screen layer surface coating can be provided on the roll 16 for putting a design into the film surface and which will be visible on the finished product, such as on the sheet 26 of FIG. 3. Also, one could even use a wire or plastic screen as a substitute for the metal base sheet 1 and get an attractive, reflective product therefrom wherein a continuous plastic film-metal coating would be applied to the carrier screen.

The process of the invention can be applied either continuously to elongate continuous base sheets, or relatively short sections of a base sheet can be coated by the process of the invention, as desired. The end product can be handled as a continuous sheet or be cut to desired lengths or sections by a flying shear, or other conventional cutting shears.

Other films that can be used in practice of the invention are films made from polyvinyl fluoride, the fluorinated co-polymer of ethylene-propionate and other similar films. Films made from cellophane, polyvinyl acetate, and polyvinyl chloride, for example, can not be used in practice of the invention. In general, it may be said that films suitable for use in practice of the invention are made from inert, tough, resilient, long lived materials that retain their normal room temperature characteristics and properties at the temperature of about 290° F., or higher, which is set up on the film at the roll bight. These films are only appreciably thermoplastic at temperatures clearly above about 290° F.

In other uses of the process of the invention, a pigmented adhesive may be used and the metal film 13 may be omitted. Such adhesive would be visible through the transparent plastic film 12 to provide a finish coat on the base sheet material used. A design, or nameplate, or advertising may, for example, be printed on the back of the plastic film 12 to be visible therethrough after the film with or without a metal film coating thereon is bonded to a base material by the process of the invention.

The laminated end product of the invention can be used for many different purposes, such as for wall finishes, for light and heat reflector units wherein a transparent plastic film 12 is provided and has a reflective surface of the aluminum metal film 13 visible therethrough on the finished laminated end product 23.

Yet another use of the composite or laminated end product 23 produced by the method shown in FIG. 1 is that of drawing or shaping metal articles therefrom. FIG. 5 shows a rear view mirror 27 which includes a metal base sheet 1a therein that is shaped to more or less cup form and is adapted to position a mirror 28 therein. The outer and exposed surface of this metal base sheet 1a in this instance is provided with a coating of the adhesive 23b that bonds a metal film 13a thereto and which metal film 13a has a plastic film 12a intimately bonded thereto to form a unitary structure therefrom. Hence, the inert plastic film 12a provides a non-oxidizable but attractive surface finish on the metal base sheet 1a to provide a novel and effective coating on the rear view mirror so that no painting, plating, or other finishing action is required thereon.

Yet another use of the composite laminate on metal, wood or resin saturated paper is in the reflective sign field where the highly reflective surface, further improved by proper selection of embossed design, results in a sign that can be readily seen in the daytime and nighttime.

It should be noted that the time required to drive off the solvent from the adhesive will vary dependent upon the temperature used, and the thickness of the coating of adhesive used etc. Usually several minutes at about 100° F. will dry the adhesive solution when forming the film unit or sheet 12, but higher drying temperatures may be used.

When printing upon the plastic film 12, and such printing is performed before metalizing the film, any color metal or adhesive can be deposited on the printed film back. Also the film may be embossed if desired to add to the design and reflective properties of the film. Such printing may even be the application of a solid color to the film back. The usual adhesive of the invention would next be applied and dried after which any desired backing sheet would be laminated to the printed film. Such colored and laminated article may also have a design or other data printed, silk screened or otherwise affixed to its face surface.

From the foregoing, it is seen that a process has been provided for putting a finish surface coating, or covering, on a number of different base materials in sheet or board form. Such surface coating, or covering of a transparent, substantially inert film has excellent adhesion to the base which may be shaped, drawn, stamped, pressed or be otherwise worked without injury, or break of the thin plastic film. Hence the objects of the invention are thought to be achieved.

While several complete embodiments of the invention have been disclosed herein, it will be appreciated that modification of these particular embodiments of the invention may be resorted to without departing from the scope of the invention as defined in the appended claims.

What is claimed is:

1. A method of making a laminated structure from a rigid flat metal base sheet and a transparent thermoplastic plastic film of about .0005 to .010 in. thick that has a continuous uniform reflective metallized back surface film thereon thinner than the plastic film and that has its room temperature characteristics at least at a temperature of up to about 290° F., which method comprises applying a uniform coating of a solution of a thermosetting rubber-resin adhesive to the metallized back surface film of the plastic film, drying such adhesive by removing the solvent therefrom to form a substantially uniformly thick adhesive layer thereon, winding up convolutions of the adhesive coated plastic film unit directly upon each other and storing the film unit at room temperature, applying a uniform layer of the same rubber-resin adhesive solution to only one face of the base sheet, heating the adhesive coated base sheet to a temperature of at least about 400° F. to dry and partially set the adhesive, unrolling the plastic film and preheating the plastic film to about 290° F., continuously moving the heated partially set adhesive coated base sheet and the preheated adhesive coated plastic film into register with the adhesive coated surfaces adjacent each other, rolling the adhesive layers on the base sheet and the plastic film together under a pressure of about 150 p.s.i. and at a speed of about 20 to 30 ft. per minute while heated to set the adhesive and form an integral bonding layer therefrom, cooling after pressure release to obtain a rigid flat laminated structure having a smooth continuous uniform plastic film surface on one face thereof, and shaping the laminated structure under ambient temperatures to non-planar form by change in shape of the metal base sheet by stresses exceeding the elastic limits of the metal base sheet, said bonding layer retaining the layers of said shaped laminated structure tightly bonded to each other during and after the shaping with said plastic film forming a uniform continuous coating over only said one face of said base sheet whereby the metallized back surface film of said plastic film forms a continuous highly reflective uniform reflective surface in the shaped laminate.

2. A method of making a laminated structure from a rigid flat metal base sheet and a transparent thermoplastic plastic film of about .0005 to .002 in. thick that has a continuous uniform reflective metallized back surface film thereon thinner than the plastic film and that has its room temperature characteristics at least at a temperature of up to about 290° F., which method comprises applying a coating of a solution of a thermosetting rubber-resin adhesive to the metallized back surface film of the plastic film, drying such adhesive, applying a uniform layer of the same rubber-resin adhesive solution to the base sheet, heating the adhesive coated base sheet to dry and partially set the adhesive, the plastic film being heated, continuously moving the heated partially set adhesive coated base sheet and the adhesive coated plastic film into register with the adhesive coated surfaces adjacent each other, rolling the adhesive layers on the base sheet and the plastic film together under a temporary pressure while heated to set the adhesive and form an integral bonding layer therefrom, cooling to obtain a rigid flat laminated structure having a smooth continuous uniform plastic film surface on only one face thereof, and shaping the laminated structure under ambient temperatures to non-planar form by stresses exceeding the elastic limits of the metal base sheet and without producing any irregularities in the plastic film, said bonding layer retaining the layers of said shaped laminated structure tightly bonded to each other with said plastic film forming a uniform continuous coating over only said once face of said base sheet and with the metallized back surface of said film forming a continuous highly reflective uniform surface in the shaped laminate.

3. A method of making a laminated reflector structure from a rigid flat metal base sheet and a transparent thermoplastic plastic film of about .0005 to about .002 in. thick that has a continuous uniform reflective metallized back surface film thereon thinner than the plastic film and that has its room temperature characteristics at least at a temperature of up to about 290° F., which method comprises applying a coating of a solution of a thermosetting rubber-resin adhesive to the metallized back surface film of the plastic film, drying such adhesive, applying a uniform layer of the same rubber-resin adhesive solution to the base sheet, heating the adhesive coated base sheet to a temperature of at least about 400° F. to dry and partially set the adhesive, the plastic film being heated to about 290° F., continuously moving the heated partially set adhesive coated base sheet and the heated adhesive coated plastic film into register with the adhesive coated surfaces adjacent each other, rolling the adhesive layers on the base sheet and the plastic film together under a temporary pressure while heated to set the adhesive and form an integral bonding layer therefrom, a rigid flat laminated structure having a smooth continuous uniform plastic film surface on one face thereof being obtained and which can be shaped under ambient temperatures to non-planar form by stresses exceeding the elastic limits of the metal base sheet, said bonding layer being adapted to retain the layers of the shaped laminated structure tightly bonded to each other with said plastic film forming a uniform continuous coating over said one face of said base sheet, and the metallized back surface of said film forming a continuous highly reflective uniform reflector in the shaped laminate.

4. A method of making a laminated structure including a rigid flat metal base sheet by providing a transparent plastic film about .0005 to .002 in. thick, said film being thermoplastic but maintaining its room temperature characteristics at least up to a temperature of about 290° F., printing desired indicia on the back surface of said film, applying a coating of a colored solution of a thermosetting rubber-resin adhesive to the printed back surface of the plastic film, drying such adhesive by heating, applying a layer of the same rubber-resin adhesive solution to the base sheet, heating the adhesive coated base sheet to at least about 400° F. to dry and partially set the adhesive, heating the plastic film to about 290° F., forcing the adhesive layers on the base sheet and the plastic film together under a temporary rolling pressure while heated and moving to set the adhesive and form an integral bonding layer therefrom, cooling after the pressure application to obtain a rigid flat laminated structure having a smooth continuous uniform plastic film surface on one face only of the metal base sheet, and shaping the laminated structure under ambient temperatures to non-planar form by stresses exceeding the elastic limits of the metal base sheet, said bonding layer retaining the layers of said shaped laminated structure tightly bonded to each other with said plastic film forming a uniform continuous coating over only said one face of said base sheet and with the printed indicia being visible therethrough.

5. A method of making a laminated structure including a rigid flat metal base sheet by providing a transparent plastic film about .0005 to .002 in. thick, said film being thermoplastic but maintaining its room temperature characteristics at least up to a temperature of about 290° F., printing desired indicia on the back surface of said film, applying a vapor deposited film of a metal to the printed back surface of said plastic film, applying a coating of a solution of a thermosetting rubber-resin adhesive to the metallized back surface of the plastic film, drying such adhesive by heating, applying a layer of the same rubber-resin adhesive solution to the base sheet, heating the adhesive coated base sheet to at least about 400° F. to dry and partially set the adhesive, heating the plastic film to about 290° F., forcing the adhesive layers on the base sheet and the plastic film together under a temporary rolling pressure while heated and moving to set the adhesive and form an integral bonding layer therefrom, cooling after the pressure application to obtain a rigid flat laminated structure having a smooth continuous uniform plastic film surface on one face only of the metal base sheet, and shaping the laminated structure under ambient temperatures to non-planar form by stresses exceeding the elastic limits of the metal base sheet, said bonding layer retaining the layers of said shaped laminated structure tightly bonded to each other with said plastic film forming a uniform continuous coating over only said one face of said base sheet and with the printed indicia being visible therethrough.

6. A method of making a laminated structure from a rigid flat metal base sheet and a transparent polyvinyl fluoride film that has a continuous uniform reflective vacuum deposited metallized back surface, which method comprises applying a coating of a solution of a thermosetting rubber-resin adhesive to the metallized back surface of the plastic film, drying such adhesive by heating, applying a uniform layer of the same rubber-resin adhesive solution to the base sheet, heating the adhesive coated base sheet to dry and partially set the adhesive, forcing the adhesive layers on the base sheet and the plastic film together under a temporary rolling pressure while heated and moving to set the adhesive and form an integral bonding layer therefrom and to obtain a rigid flat laminated structure having a smooth continuous uniform plastic film surface on one face only of the metal base sheet, and shaping the laminated structure under ambient temperatures to non-planar form by stresses exceeding the elastic limits of the metal base sheet, said bonding layer retaining the layers of said shaped laminated structure tightly bonded to each other with said plastic film forming a uniform continuous coating over only said one face of said base sheet.

7. A method of making a laminated structure from a rigid flat metal base sheet and a transparent fluorinated copolymer of ethylene-propionate film that has a continuous uniform reflective vacuum deposited metallized back surface, which method comprises applying a coating of a solution of a thermosetting rubber-resin adhesive to the metallized back surface of the plastic film, drying such adhesive by heating, applying a uniform layer of the same rubber-resin adhesive solution to the base sheet, heating the adhesive coated base sheet to dry and partially set the adhesive, forcing the adhesive layers on the base sheet and the plastic film together under a temporary rolling pressure while heated and moving to set the adhesive and form an integral bonding layer therefrom and to obtain a rigid flat laminated structure having a smooth continuous uniform plastic film surface on one face only of the metal base sheet, and shaping the laminated structure under ambient temperatures to nonplanar form by stresses exceeding the elastic limits of the metal base sheet, said bonding layer retaining the layers of said shaped laminated structure tightly bonded to each other with said plastic film forming a uniform continuous coating over only said one face of said base sheet.

8. A method of making a laminated structure from a rigid flat metal base sheet and a transparent polyester film that has a continuous uniform reflective vacuum deposited metallized back surface, which method comprises applying a coating of a solution of a thermosetting rubber-resin adhesive to the metallized back surface of the plastic film, drying such adhesive by removing the solvent therefrom, winding up convolutions of the adhesive coated plastic film unit directly upon each other and storing the film unit at room temperature, applying a uniform layer of the same rubber-resin adhesive solution to the base sheet, heating the adhesive coated base sheet to dry and partially set the adhesive, unrolling the plastic film and preheating the moving plastic film, forcing the adhesive layers on the base sheet and the plastic film together under a temporary rolling pressure while heated and moving to set the adhesive and form an integral bonding layer therefrom, cooling after the pressure application to obtain a rigid flat laminated structure having a smooth continuous uniform plastic film surface on one face only of the metal base sheet, and shaping the laminated structure under ambient temperatures to nonplanar form by stresses exceeding the elastic limits of the metal base sheet, said bonding layer retaining the layers of said shaped laminated structure tightly bonded to each other with said plastic film forming a uniform continuous coating over only one face of said base sheet.

References Cited in the file of this patent

UNITED STATES PATENTS

| | | |
|---|---|---|
| 1,909,862 | Honegger | May 16, 1933 |
| 1,993,254 | Booth | Mar. 5, 1935 |
| 2,511,816 | Shaw | June 13, 1950 |
| 2,632,722 | Libberton | Mar. 24, 1953 |
| 2,688,580 | Fingerhut | Sept. 7, 1954 |
| 2,710,263 | Clark et al. | June 7, 1955 |
| 2,714,559 | Sheffield et al. | Aug. 2, 1955 |
| 2,836,528 | Ford | May 27, 1958 |
| 2,858,248 | Hastings et al. | Oct. 28, 1958 |
| 2,877,151 | Doherty et al. | Mar. 10, 1959 |

OTHER REFERENCES

Modern Plastics, No. 1, vol. 21, September 1943; "Cycleweld—a New Bonding Process"; pp. 65–69 and 152.

Handbook of Material Trade Names, by Zimmerman and Lamrie, 1953 Edition, published by Industrial Research Service, page 452.